United States Patent [19]
Yoshida et al.

[11] Patent Number: 6,127,473
[45] Date of Patent: Oct. 3, 2000

[54] POLYESTER FILM

[75] Inventors: Tetsuo Yoshida; Yukihiko Minamihira; Koji Kubo; Hirofumi Murooka, all of Sagamihara, Japan

[73] Assignee: Teijin Limited, Osaka, Japan

[21] Appl. No.: 09/297,555

[22] PCT Filed: Sep. 4, 1998

[86] PCT No.: PCT/JP98/03982

§ 371 Date: May 3, 1999

§ 102(e) Date: May 3, 1999

[87] PCT Pub. No.: WO99/12998

PCT Pub. Date: Mar. 18, 1999

[30] Foreign Application Priority Data

Sep. 10, 1997 [JP] Japan ................................. 9-245335

[51] Int. Cl.[7] .................................................... C08K 3/36
[52] U.S. Cl. ........................... 524/493; 528/300; 524/605
[58] Field of Search ............................. 528/300; 524/493, 524/605

[56] References Cited

U.S. PATENT DOCUMENTS 4,931,500  6/1990  Okamoto et al. ....................... 525/60

FOREIGN PATENT DOCUMENTS

| 62-52045 | 3/1987 | Japan . |
| 63-12445 | 1/1988 | Japan . |
| 1-124551 | 5/1989 | Japan . |
| 1-182248 | 7/1989 | Japan . |
| 3-63124 | 3/1991 | Japan . |
| 4-117427 | 4/1992 | Japan . |
| 6-107815 | 4/1994 | Japan . |
| 6-107815A | 4/1994 | Japan . |
| 8-309924 | 11/1996 | Japan . |
| 8-309924A | 11/1996 | Japan . |

*Primary Examiner*—Robert Dawson
*Assistant Examiner*—Kuo-Liang Peng
*Attorney, Agent, or Firm*—Sughrue, Mion, Zinn, Macpeak & Seas, PLLC

[57] ABSTRACT

Provided is a polyester film containing a lubricant having an average particle diameter of 0.001 to 2.5 μm in an amount of 0.01 to 5.0% by weight and suited for the lamination onto the surface that comes in contact with the contents of an easy-open can cap. The polyester film has a plane orientation coefficient of 0.115 to 0.140, two or more endothermic peaks in DSC curve in the range of 170 to 270° C., a peak temperature of 60 to 120° C. of a complex elastic modulus (E") in water and an intrinsic viscosity of 0.50 to 0.64 dl/g. Having these features, the polyester film laminated onto a metal sheet is excellent in can-capping processability and in corrosion resistance even after holding at high temperature.

6 Claims, No Drawings

POLYESTER FILM

TECHNICAL FIELD

The present invention relates to a polyester film. More particularly, the invention concerns a polyester film excellent in can-capping processability, corrosion resistance and mechanical properties, and most suited for the lamination onto the surface that comes in contact with the contents, of the cap of a metallic easy-open can.

BACKGROUND ART

The pull top type or stay-on type cap of an easy-open can is widely used as the cap of a metallic can which can be opened without using a can opener or the like.

The cap of an easy-open can is produced by using aluminum, tin plate, tin-free steel (TFS) or the like as the metallic material; the inner surface of the can cap that comes in contact with the contents is coated with a corrosion proofing membrane; and then the metal sheet is scored at a position where an opening is to be formed to define an openable sector. Inner coatings are damaged or ruptured by the scoring process in many cases, and therefore a repair coating film is placed on the coating film.

Generally, a corrosion proofing coating film is formed, for example, by dissolving or dispersing a coating agent containing a corrosion inhibitor in a solvent such as an organic solvent or the like to prepare a coating liquid, applying the resultant coating liquid on a metal sheet and removing the solvent by drying.

The remaining minute amount of the solvent therefore possibly flows out into the contents of the can to contaminate them. Further, a repair coating is required in many cases, and this causes troubles in productivity.

As measures for preventing the pollution of the contents and dispensing with the repair coating, methods in which specific polyester films are laminated on metallic materials have been disclosed (Japanese Unexamined Patent Publication No. 62-52045, Japanese Unexamined Patent Publication No. 63-12445, Japanese Unexamined Patent Publication No. 1-124551, Japanese Unexamined Patent Publication No. 1-182248 and Japanese Unexamined Patent Publication No. 3-63124).

However, the can caps produced even by these methods are still apt to corrode at the scored parts, and especially when the can is kept hot (higher than 60° C.) before eating or drinking, corrosion may develop at the scored parts.

Problems to Be Solved by the Invention

It is an object of the present invention to solve these shortcomings of the conventional technologies and to provide a polyester film free from corrosion at the scored parts even during holding at high temperature and most suited for the cap of an easy-open can.

Means for Solving the Problems

Such object of the present invention is achieved, according to the present invention, by a polyester film comprises a polyester containing a lubricant having an average particle diameter of 0.001 to 2.5 μm in an amount of 0.01 to 5.0% by weight, wherein the film is characterized in that it has a plane orientation coefficient of 0.115 to 0.140, two or more endothermic peaks in DSC curve in the range of 170 to 270° C. and a peak temperature of 60–120° C. of a complex elastic modulus (E") in water, and the polyester which constitutes the film has an intrinsic viscosity of 0.50 to 0.64 dl/g.

The present invention will be explained hereafter further in detail.

(i) Polyester

The polyester used in the present invention is a linear polyester comprising dicarboxylic acid component(s) and glycol component(s). The examples of the polyester include homopolymers and copolymers such as polyethylene terephthalate, polyethylene isophthalate, polybutylene terephthalate, polyethylene 2,6-naphthalate and the like.

Among them, a polyester having a melting point of 270° C. or less is preferable since film (especially biaxially oriented film) can be easily produced from it on an industrial scale, and a polyethylene terephthalate copolymer is especially preferable. The copolymer component other than terephthalic acid and ethylene glycol in the polyethylene terephthalate copolymer may be either a dicarboxylic acid component or a glycol component. The dicarboxylic acid component is, for example, an aromatic dicarboxylic acid such as isophthalic acid, phthalic acid or naphthalene dicarboxylic acid; an aliphatic dicarboxylic acid such as adipic acid, azelaic acid, sebacic acid or decanedicarboxylic acid; or an alicyclic dicarboxylic acid such as cyclohexanedicarboxylic acid. The glycol component is, for example, an aliphatic diol such as butanediol or hexanediol; or an alicyclic diol such as cyclohexanedimethanol. Especially, the use of at least one kind selected from isophthalic acid and naphthalenedicarboxylic acid as the copolymer component is preferable for achieving the object of the present invention. These copolymer components can be used singly or in combination of two or more.

In the case of a polyester copolymer, the kind and the proportion of the copolymer component are selected in such a manner that when the polyester film is subjected to biaxial stretching, the obtained biaxially oriented film resultingly has endothermic peaks in DSC curve in the range of 170 to 270° C. and a peak temperature of 60 to 120° C. of a complex elastic modulus (E") in water. Both of these properties of the film will be explained later.

The polyesters used in the present invention are not restricted by the production processes. Production of a homopolymer or a copolymer of the polyethylene terephthalate is preferably carried out, for example, through a process which comprises subjecting terephthalic acid, ethylene glycol and optionally copolymer component(s) to an esterification reaction and then subjecting the resulting reaction product to a polycondensation to obtain the objective polyester, or a process which comprises subjecting dimethyl terephthalate, ethylene glycol and optionally copolymer component(s) to an ester interchange reaction and then subjecting the resulting reaction product to a polycondensation reaction to obtain the objective polyester.

The polyester used in the present invention includes, for example, a mixture obtained by adding plural kinds of polyester selected from polyethylene terephthalate, polyethylene isophthalate, polyethylene 2,6-naphthate, polybutylene terephthalate and the like, and a polyester copolymer obtained by melting the mixture followed by an ester interchange reaction.

In the production of the polyester, it is also possible to add, as necessary, other additives, for example, such as a fluorescent whitening agent, an antioxidant, a heat stabilizer, an ultraviolet absorber and/or an antistatic agent.

Examples of the catalyst used in the polymerization of a polyester of the present invention include antimony compounds, titanium compounds, germanium compounds and the like. Preferable examples of the antimony compound are antimony trioxide and antimony acetate, and preferable examples of the titanium compound are titanium tetrabutoxide, titanium acetate and the like. Further, preferable examples of the germanium compound include amorphous germanium oxide, fine crystalline germanium oxide, a solution prepared by dissolving germanium oxide in glycol in the presence of an alkali metal or an alkaline earth metal, or their compound, a solution prepared by dissolving germanium oxide in water and the like.

It is preferable to use especially a metal salt of germanium among these compounds, and further to keep the content of an alkali metal in the polyester not to exceed 5 ppm since this reduces the amounts of metal salts eluted into water, and thereby the preservation of taste and flavor of the contents in the can is improved.

(ii) Lubricant

The polyester of the present invention is required to contain a lubricant having an average particle diameter of 0.001 to 2.5 μm in an amount of 0.01 to 5.0% by weight. The lubricant may be an inorganic type or an organic type. The inorganic lubricant can be inorganic fine particles, for example, such as silica, alumina, titanium dioxide, calcium carbonate and barium sulfate. On the other hand, the organic lubricant can be resin fine particles, for example, such as a crosslinked silicone resin and a crosslinked polystyrene resin.

The lubricant of the present invention has an average particle diameter of 0.001 to 2.5 μm. When the average particle diameter exceeds 0.25 μm, the ratio of coarse lubricant particles (e.g. particles of 10 μm or greater) becomes large, and thereby pinholes are liable to occur in the film during a can-capping process, especially during scoring processing, and corrosion breaks out in the scored part. Hence, a lubricant having such an average particle diameter is not preferred. On the other hand, when the average particle diameter is smaller than 0.001 μm, the slipperiness of the film during the film-making process is insufficient, and this makes the smooth production of the film difficult. Hence, a lubricant having such an average particle diameter is not preferred.

The lubricant especially preferable from the view point of the prevention of the above-mentioned pinhole problems is monodisperse spherical silica having an average particle diameter of 0.01 to 2.0 μm and a particle diameter ratio (major diameter/minor diameter) of 1.0 to 1.2. Examples of such lubricants include spherical silica, spherical silicone, spherical calcium carbonate and the like.

The ratio of a lubricant in the polyester is 0.01–5.0% by weight, but it is preferred that, within this range of the ratio, the lubricant having a larger average particle diameter is added in a smaller amount, and that having a smaller average particle diameter is added in a larger amount. For example, spherical silica having an average particle diameter of 2.3 μm is added in an mount of about 0.05% by weight, and spherical silica having an average particle diameter of 1.5 μm is added in an amount of about 0.1% by weight.

It is not preferable that the ratio of a lubricant is less than 0.01% by weight since the slipperiness of the film during the film-making process is insufficient, and this makes the smooth production of the film difficult. On the other hand, the addition of the lubricant in an amount exceeding 5.0% by weight does not promote improving effect on the slipperiness of the film because of saturation, and it is not preferable to use such an amount since it brings excessive quality and increases production cost.

The lubricant is not limited to the external particles added from outside as mentioned above, but the internally precipitated particles, for example, formed by precipitating the catalyst or the like used in the production of the polyester partly or totally in the reaction process can be used, and further the internally precipitated particles and the externally precipitated particles may be used together.

(iii) Polyester Film

The polyester of the present invention must have a peak temperature of 60 to 120° C., preferably 70 to 120° C., especially preferably 80 to 110° C. of a complex elastic modulus (E") in water.

The peak temperature of a complex elastic modulus (E") is determined by using a dynamic viscoelastometer (Rheovibron DDV-01FP manufactured by Orientec Co. Ltd.; measuring frequency of 10 Hz).

When the peak temperature of a complex elastic modulus (E") in water is lower than 60° C., corrosion is apt to be provoked around the scored parts by the water or the like permeated through the polyester film while a metallic can containing the contents, especially drinks, is held at a high temperature before using, and hence such a peak temperature is not preferred. On the other hand, when the peak temperature of a complex elastic modulus (E") in water exceeds 120° C., the processing of the laminate which is formed on a metallic material becomes difficult, and hence such a peak temperature is also not preferred.

This requirement concerning the peak temperature of a complex elastic modulus (E") in water, that is, it must be in the range of 60 to 120° C., is achieved by rendering the heat characteristic of the polyester proper, for example, by properly selecting the kind and proportion of the copolymer component in the case of a polyester copolymer.

An intrinsic viscosity of the polyester constituting the polyester film of the present invention is in the range of 0.50 to 0.64 dl/g, preferably 0.50 to 0.60 dl/g. When the intrinsic viscosity is lower than 0.50 dl/g, film rupture is often observed during biaxial stretching of the film which have been formed by extruding molten polyester, and long-sized film can not be produced and hence not preferred. On the other hand, when the intrinsic viscosity exceeds 0.64 dl/g, scoring processability becomes poor, and hence such an intrinsic viscosity is also not preferred. Here, the intrinsic viscosity is measure in o-chlorophenol at 35° C.

Further, the polyester film of the present invention must have a plane orientation coefficient in the range of 0.115 to 0.140, preferably 0.125 to 0.140. When the plane orientation coefficient is less than 0.115, the film may invite problems such as unevenness in the thickness of the film and the fluctuation in film processability, and thereby the corrosion resistance is weakened. On the other hand, when the plane orientation coefficient is more than 0.140, the processing of the laminate which is formed on a metallic material becomes difficult. Hence, a plane orientation coefficient out of the above-mentioned range is not preferred.

The plane orientation coefficient is defined by the following equation.

Plane orientation coefficient=$\{(n_x+n_y)/2\}-n_z$ wherein,
$n_x$: refractive index of film in longitudinal direction
$n_y$: refractive index of film in transverse direction
$n_z$: refractive index of film in thickness direction These refractive indexes are measured as follows. A polarizing plate analyzer is attached at the ocular side of an Abbe's refractometer, and each of refractive indexes is measured by using a monochromic light (Na D ray). In this case, the mount liquid is methylene iodide, and the measurement temperature is 25° C.

Furthermore, the polyester film of the present invention must have two or more endothermic peaks in DSC curve in the range of 170 to 270° C., preferably 170 to 245° C. These endothermic peaks in DSC curve include the endothermic peak attributable to the above-mentioned melting point of the polyester. The endothermic peak attributable to the melting point is normally observed as the peak having the highest temperature among said two or more endothermic peaks. The situation in which any endothermic peak is at a temperature lower than 170° C., or only one endothermic peak is observed suggests insufficient heatsetting during the film-making process, and in such a situation, wrinkles are apt to be generated during the thermo bonding of the film on a metallic material, and the resulting film is short of strength for lamination. Hence, such a situation is not preferred. On the other hand, when any of the endothermic peaks is at a temperature higher than 270° C., processability of the film tends to decline, and hence such a situation is also not preferred.

The endothermic peaks of the polyester are determined in the following way: a differential calorimeter (e.g. Du Pont Instruments 910 DSC) is used; the amount of the film sample is about 20 mg; and the temperature is elevated from the normal temperature up to 290° C. at a rate of 20° C./min to produce an endothermic curve from which the peaks are determined. The term "the presence of an endothermic peak in DSC curve in the range of 170 to 270° C." means that the temperature of the top of the endothermic peak in DSC curve is in the range of 170 to 270° C.

The requirements of having a plane orientation coefficient in the range of 0.115 to 0.140, and two or more endothermic peaks in DSC curve exist in the range of 170 to 270° C. can be satisfied by the following method. Namely, film is produced by biaxial stretching process, and particularly by successive biaxial stretching process which is carried out under conditions specifically selected for the stretching and heatsetting. For example, when the polyester is a polyethylene terephthalate copolymer, biaxial stretch heatsetting process is preferably conducted at a longitudinal stretch ratio of 2.5 to 3.6, a transverse stretch ratio of 2.7 to 4.0 and a heatsetting temperature of 170 to 250° C. for 1 to 5 min. More particularly, the conditions which can give the plane orientation coefficient and the endothermic peaks in DSC curve of the film satisfying the above-mentioned requirements are selected beforehand from said ranges of conditions, and the biaxial stretching and heatsetting treatment are conducted based thereon.

The polyester film of the present invention may be produced by using a conventionally known film-making process, for example, a successive biaxial stretching process or a concurrent biaxial stretching process.

The successive biaxial stretching process will be concretely explained hereafter. At first, a polyester is molten, the molten polyester is extruded through a slit-shaped die into a sheet, and the sheet is rapidly cooled to produce a sheet-shaped unstretched film. The unstretched film is heated by rolls, infrared rays or the like, and then stretched in the longitudinal direction to obtain a longitudinally stretched film. The stretching is preferably conducted by utilizing the peripheral speed difference between tow or more rolls. The stretching is preferably carried out at a temperature higher than the glass transition temperature (Tg) of the polyester, more preferably at a temperature higher than the Tg by 20 to 50° C. The stretch ratio differs depending upon the physical properties of the final film, but it is preferably 2.5 or more. Further, it is preferable to keep the ratio not to exceed 3.6.

The longitudinally stretched film is successively subjected to a transverse stretching, optionally followed by heatsetting to obtain a biaxially oriented film; these treatments are continuously carried out while the film is traveling. The transverse stretching is started at a film temperature higher than Tg by 20° C., and it is continued while the temperature is being elevated up to a temperature lower than the melting point (Tm) by 120 to 30° C. The stretching initiation temperature is preferably equal to Tg+40° C. or lower. For example, in the case of a polyethylene terephthalate prepared by copolymerizing 12% isophthalic acid by mole, a stretching initiation temperature is preferably in the range of 73 to 120° C., and the maximum stretching temperature is preferably in the range of 128 to 188° C.

The temperature elevation during the transverse stretching may be continuous or stepwise (successive), but it is usually successive. The successive temperature elevation is curried out, for example, by plurally dividing the transverse stretching zone of a stenter with dividing lines perpendicular to the film-traveling direction and letting a heating medium of the predetermined different temperature flow through each zone. Too low a transverse stretching initiation temperature sometimes gives rise to film rupture. Further, when the stretching maximum temperature is too low, this sometimes increases film heat shrinkage and lowers homogeneity of physical properties of the film in lateral direction. On the other hand, when the stretching maximum temperature is too high, the film becomes soft, and thereby the film is sometimes ruptured by disturbance or the like.

The ratio of transverse stretching is preferably 2.7 or more, further preferably 3.0 to 4.0.

The transversely stretched film is successively subjected to heatsetting if necessary; and the heatsetting is preferably carried out at a temperature in the range of 170 to 250° C. for 1 to 5 min.

The polyester film of the present invention has a thickness preferably of 6 to 50 μm, more preferably 10 to 40 μm. When the thickness is thinner than 6 μm, film rupture is apt to occur during a processing such as can-capping or the like, and on the other hand, when thickness exceeds 50 μm, such a film has an over quality, and hence it is uneconomical.

As a metal sheet for making a can cap on which polyester film is to be laminated, sheets of tinplate, tin-free steel (TFS), aluminum and the like are suitable, especially sheets of tin-free steel (TFS) and aluminum are preferred.

The lamination of polyester film onto a metal sheet is conducted, for example, by the following method 1 or 2.

1. A film is laminated onto a metal sheet which has been heated to a temperature equal to, or higher than the melting point of the film; the laminate is rapidly cooled to make amorphous the surface layer (thin layer) of the film in contact with the metal sheet, and thereby tight adhesion is achieved.

2. A film is beforehand coated with an adhesive as a primer; and the coated surface is laminated onto a metal sheet. A known resin such as an epoxy adhesive, an epoxyester adhesive, an alkyd adhesive or the like can be used as the adhesive.

EXAMPLES

The present invention will be explained further in detail hereafter with examples.

Examples 1 to 5, and Comparative Examples 1 to 8

A polyethylene terephthalate copolymer in which copolymer component(s) shown in Table 1 has/have been copolymerized, and which contains a bulk silica having an average particle diameter shown in Table 1 at a ratio shown in Table 1 was melt-extruded at 280° C. and solidified by rapid cooling on a rotary drum to obtain an unstretched film.

Then, the unstretched film was subjected to longitudinal stretching, transverse stretching and heatsetting by a successive biaxial stretching method under conditions shown in Table 1, to obtain a polyester film of 20 μm thick for laminating onto the cap of a metallic can. The melting point of the polyesters and the intrinsic viscosity, the peak temperature of complex elastic modulus (E") in water, the plane orientation coefficient and the peak temperatures in DSC curve of the obtained film are shown in Table 1 and Table 2.

The obtained film was placed on one side of tin-free steel sheet of 100 μm thick heated at 250° C. and pressed by a laminating machine for two seconds, and then rapidly cooled to obtain a polyester film-laminated metal sheet. The metal sheet was punched out into a disc in a pressing process and then formed into a desired shape of a can cap according to a known method. Then, the obtained can-cap-shaped sheet was scored from the outside surface of a can cap by using a scoring die in a scoring process under such a condition that the score reaches a midway of the thickness of the metallic material. The remaining thickness of the scored metallic material was 50 μm.

Subsequently, a rivet which is protruding outside was formed at a scored opening by using a rivet-forming die in a rivet-forming process, an opening tab was integrated with the rivet in a tab-fixing process, and the rivet was tacked to fix the tab.

The polyester film of the polyester film-laminated metal sheet was examined for the existence of defects (wrinkles, rupture, peeling from metal sheet, etc.) in the above-mentioned laminating process, pressing process, scoring process and rivet forming process, and rated a sample having no defect as "excellent in processability (◯)" and a sample having any defect as "poor in processability (X).

Subsequently, samples excellent in processability were held in water at 60° C. for one month, and then examined the existence of corrosion by observing the scored parts and rated a sample having none of defect such as corrosion as "excellent in corrosion-resistance (◯)" and a sample having any defect such as corrosion as "poor in corrosion-resistance (X)". The results of the ratings of processability and corrosion-resistance are shown in Table 2.

TABLE 1

| | Polyester Composition | | | | | | | Film-Making Conditions | | | | |
| | Copolymer | | | | Lubricant (Silica) | | | | | | | |
| | Component (Note) Copolymerization Ratio (mol %) | | | | Particle Size | Added Amount | Melting Point | Longitudinal Stretching | | Transverese Stretching | | Thermosetting |
| | IA | NDCA | SA | TMG | (μm) | (wt. %) | (° C.) | Temp. (° C.) | Magnification | Temp. (° C.) | Magnification | Temp. (° C.) |
|---|---|---|---|---|---|---|---|---|---|---|---|---|
| Example 1 | 6 | 6 | — | — | 1.5 | 0.1 | 230 | 120 | 3.2 | 130 | 3.3 | 195 |
| Example 2 | 12 | — | — | — | 0.3 | 0.5 | 228 | 110 | 3.2 | 120 | 3.3 | 195 |
| Example 3 | 8 | — | — | — | 0.8 | 0.2 | 238 | 115 | 3.2 | 125 | 3.3 | 200 |
| Example 4 | 12 | — | — | — | 1.5 | 1.0 | 228 | 110 | 3.4 | 120 | 3.5 | 195 |
| Example 5 | — | 20 | — | — | 1.5 | 1.0 | 201 | 130 | 3.2 | 140 | 3.3 | 185 |
| Comp. Example 1 | 1 | — | — | — | 1.5 | 0.1 | 253 | 120 | 3.2 | 130 | 3.3 | 195 |
| Comp. Example 2 | — | — | 12 | — | 0.3 | 0.5 | 229 | 100 | 3.2 | 110 | 3.3 | 195 |
| Comp. Example 3 | — | — | — | (30) | 1.5 | 0.1 | 250 | 90 | 3.2 | 100 | 3.3 | 185 |
| Comp. Example 4 | 6 | 6 | — | — | 1.5 | 0.1 | 230 | 120 | 2.9 | 130 | 3.0 | 195 |
| Comp. Example 5 | 6 | 6 | — | — | 1.5 | 0.1 | 230 | 110 | 3.6 | 120 | 3.7 | 195 |
| Comp. Example 6 | 6 | 6 | — | — | 0.3 | 0.5 | 230 | 120 | 3.2 | 130 | 3.3 | 195 |
| Comp. Example 7 | 6 | 6 | — | — | 0.3 | 0.5 | 230 | 120 | 3.2 | 130 | 3.3 | 170 |

TABLE 1-continued

| | Polyester Composition | | | | | | | Film-Making Conditions | | | | |
|---|---|---|---|---|---|---|---|---|---|---|---|---|
| | Copolymer | | | | Lubricant (Silica) | | | Longitudinal Stretching | | Transverese Stretching | | |
| | Component (Note) Copolymerization Ratio (mol %) | | | | Particle Size | Added Amount | Melting Point | Temp. | | Temp. | | Thermosetting |
| | IA | NDCA | SA | TMG | (μm) | (wt. %) | (° C.) | (° C.) | Magnification | (° C.) | Magnification | Temp. (° C.) |
| Comp. Example 8 | 6 | 6 | — | — | 3.0 | 0.1 | 230 | 120 | 3.2 | 130 | 3.3 | 195 |

(Note)
IA: isophthalic acid,
NDCA: 2,6-naphtahlene dicarboxylic acid,
SA: sebacic acid,
TMG: 1,4-butandiol
Reference Example 3: 70 wt. % of polyethylene terephthalate and 30 wt. % of polybutylene terephthalate are blended

TABLE 2

| | Properties of Polyester Film | | | | | | | |
|---|---|---|---|---|---|---|---|---|
| | Intrinsic Viscosity (dl/g) | Peak Temp. of E" (° C.) | Plain Orientation Coefficient | DSC Peak Temp. | | Evaluation of Can End | | |
| | | | | Low Temp Side (° C.) | High Temp Side (° C.) | Processability | Corrosion Resistance | Note |
| Example 1 | 0.58 | 74 | 0.128 | 192 | 231 | ○ | ○ | |
| Example 2 | 0.58 | 69 | 0.121 | 192 | 228 | ○ | ○ | |
| Example 3 | 0.54 | 70 | 0.128 | 197 | 239 | ○ | ○ | |
| Example 4 | 0.58 | 69 | 0.135 | 191 | 229 | ○ | ○ | |
| Example 5 | 0.52 | 80 | 0.120 | 181 | 202 | ○ | ○ | |
| Comp. Example 1 | 0.54 | 71 | 0.154 | 191 | 254 | x | — | Film rupture during can-capping |
| Comp. Example 2 | 0.59 | 59 | 0.125 | 190 | 229 | ○ | x | |
| Comp. Example 3 | 0.54 | 55 | 0.128 | 181 | 248 | ○ | x | |
| Comp. Example 4 | 0.58 | 73 | 0.112 | 192 | 230 | ○ | x | |
| Comp. Example 5 | 0.58 | 75 | 0.145 | 193 | 231 | x | — | Film rupture during can-capping |
| Comp. Example 6 | 0.66 | 74 | 0.129 | 192 | 231 | x | — | Film rupture during can-capping |
| Comp. Example 7 | 0.58 | 74 | 0.125 | 167 | 230 | x | — | Frequent wrinkle during lamination |
| Comp. Example 8 | 0.58 | 74 | 0.128 | 192 | 231 | x | — | Film rupture during can-capping |

As is clear from the results shown in Table 2, the polyester films of the present invention exhibit excellent can-capping processability and corrosion-resistance when laminated onto the caps of easy-open cans.

Effects of the Invention

The polyester film of the present invention, when laminated onto the inner surface of the cap of an easy-open can, has excellent can-capping processability and corrosion resistance, especially excellent in corrosion resistance after holding at high temperature.

What is claimed is:

1. A polyester film, (A) which comprises a copolyester comprising terephthalic acid and dicarboxylic acid component which is at least one kind selected from isophthalic acid and naphthalene dicarboxylic acid, and ethylene glycol, and containing a lubricant having an average particle diameter of 0.001 to 2.5 μm in an amount of 0.01 to 5.0% by weight, (B) which has a plane orientation coefficient of 0.115 to 0.140,
(C) which has two or more endothermic peaks in DSC curve in the range of 170 to 270° C.,
(D) which has a peak temperature of 60 to 120° C. of a complex elastic modulus (E") in water, and
(E) of which the polyester has an intrinsic viscosity of 0.50 to 0.60 dl/g.

2. A polyester film as claimed in claim 1, which has a plane orientation coefficient of 0.125 to 0.140.

3. A polyester film as claimed in claim 1, which has two or more endothermic peaks of DSC in the range of 170 to 245° C.

4. A polyester film as claimed in claim 1, wherein the lubricant is spherical silica having an average particle diameter of 0.01 to 2.0 μm and a particle diameter ratio (major diameter/minor diameter) of 1.0 to 1.2.

5. A polyester film as claimed in claim 1, wherein the main polymerization catalyst of the polyester is a germanium metal salt, and the content of alkali metal in the polyester is 5 ppm or lower.

6. A polyester film as claimed in claim 1, which is suited for the lamination onto the surface that comes in contact with the contents, of an easy-open can cap.

* * * * *